(12) United States Patent
Deluccia, Jr.

(10) Patent No.: US 10,875,723 B2
(45) Date of Patent: Dec. 29, 2020

(54) APPARATUS FOR TRANSPORTING, INSPECTING, AND PROCESSING PELLET-SHAPED ARTICLES

(71) Applicant: ACKLEY MACHINE CORPORATION, Moorestown, NJ (US)

(72) Inventor: Vincent M. Deluccia, Jr., Riverside, NJ (US)

(73) Assignee: ACKLEY MACHINE CORPORATION, Moorestown, NJ (US)

(*) Notice: Subject to any disclaimer, the term of this patent is extended or adjusted under 35 U.S.C. 154(b) by 0 days.

(21) Appl. No.: 16/315,779

(22) PCT Filed: Jul. 6, 2017

(86) PCT No.: PCT/US2017/040839
§ 371 (c)(1),
(2) Date: Jan. 7, 2019

(87) PCT Pub. No.: WO2018/009617
PCT Pub. Date: Jan. 11, 2018

(65) Prior Publication Data
US 2019/0144212 A1 May 16, 2019

Related U.S. Application Data

(60) Provisional application No. 62/360,039, filed on Jul. 8, 2016.

(51) Int. Cl.
*B65G 47/14* (2006.01)
*B07C 5/02* (2006.01)
(Continued)

(52) U.S. Cl.
CPC ............ *B65G 47/1471* (2013.01); *B07C 5/02* (2013.01); *B07C 5/04* (2013.01); *B41F 17/36* (2013.01);
(Continued)

(58) Field of Classification Search
CPC .......... B65G 47/1471; B07C 5/02; B07C 5/04
See application file for complete search history.

(56) References Cited

U.S. PATENT DOCUMENTS 2,785,786 A 3/1957 Bartlett
3,884,143 A * 5/1975 Ackley .................. B41F 17/36
101/37

(Continued)

OTHER PUBLICATIONS

International Search Report for PCT/US2017/040839 dated Sep. 6, 2017, 2 pages.
(Continued)

*Primary Examiner* — William R Harp
(74) *Attorney, Agent, or Firm* — Nixon & Vanderhye P.C.

(57) ABSTRACT

A carrier link to convey at least one pellet-shaped article along a predetermined conveyer path in a direction of travel includes at least one pocket adapted to receive a pellet-shaped article and a lead-in surface provided to an upper exterior surface of the carrier link and extending into leading edges of the pocket. Each pocket includes a longitudinal axis that is transverse to a direction of travel of the carrier link. The lead-in surface provides a ramped or declined surface into the pocket to facilitate entry of the pellet-shaped article into the pocket. The lead-in surface is ramped or declined towards a side of the carrier link to facilitate rotating, guiding, and/or orienting of the pellet-shaped article into the pocket.

16 Claims, 15 Drawing Sheets

(51) Int. Cl.
*B07C 5/04* (2006.01)
*B41F 17/36* (2006.01)
*G01N 21/95* (2006.01)
*B65B 63/00* (2006.01)
*B65G 17/44* (2006.01)

(52) U.S. Cl.
CPC ........ *G01N 21/9508* (2013.01); *B65B 63/005* (2013.01); *B65G 17/44* (2013.01)

(56) References Cited

U.S. PATENT DOCUMENTS

| | | | |
|---|---|---|---|
| 4,104,966 A | 8/1978 | Ackley, Jr. et al. | |
| 4,189,996 A * | 2/1980 | Ackley, Sr. | B41F 17/36 101/37 |
| 4,208,962 A * | 6/1980 | Ackley, Sr. | B41F 17/36 101/35 |
| 4,254,704 A | 3/1981 | Ackley, Sr. et al. | |
| 4,632,028 A * | 12/1986 | Ackley | A61J 3/074 101/40 |
| 8,072,590 B2 | 12/2011 | Ackley, Jr. et al. | |
| 8,646,591 B2 * | 2/2014 | De Ruijter | A61J 3/007 198/397.01 |
| 9,096,390 B2 * | 8/2015 | Ackley | B07C 5/00 |
| D847,230 S * | 4/2019 | Deluccia, Jr. | B41F 17/36 D15/138 |
| 2010/0252401 A1 | 10/2010 | Ackley, Jr. | |
| 2013/0277171 A1 | 10/2013 | Ackley, Jr. et al. | |

OTHER PUBLICATIONS

Written Opinion of the ISA for PCT/US2017/040839 dated Sep. 6, 2017, 4 pages.
Extended European Search Report dated Feb. 10, 2020 in European Application No. 17824858.9, 7 pages.
Examination Report dated Jun. 23, 2020 in Indian Application No. 201917001647, 5 pages.

* cited by examiner

APPARATUS FOR TRANSPORTING, INSPECTING, AND PROCESSING PELLET-SHAPED ARTICLES

CROSS-REFERENCE TO RELATED APPLICATIONS

This application is the U.S. national phase of International Application No. PCT/US2017/040839 filed Jul. 6, 2017 which designated the U.S. and claims priority to U.S. Provisional Application No. 62/360,039 filed Jul. 8, 2016, the entire contents of each of which are hereby incorporated by reference.

FIELD OF THE TECHNOLOGY

The present technology relates to apparatuses for transporting, inspecting, and processing pellet-shaped articles, e.g., tablets, longitudinally compressed tablets (LCTs), caplets, lentil-shaped articles, etc.

BACKGROUND OF THE TECHNOLOGY

Processing of pellet-shaped articles (e.g., tablets, caplets, lentil-shaped articles, etc), such as marking the articles with indicia, coloring the articles, laser drilling holes in the articles, coating the articles, and/or inspecting the articles is known in the art. The articles may be transported past one or more processing stations (e.g., printing, inspection, drilling, etc.) by carrier bars or links provided with one or more article receiving pockets.

In a typical application, the carrier bars or links are transported along a conveyer. The articles are fed into the pockets on the carrier bar or link from a hopper. Empty pockets are brought past the hopper for receiving the articles and the pockets are gravity-fed with the articles. The further processing of the articles in the pockets requires that the articles be oriented uniformly and held in position in the pockets during processing. Achieving a high fill rate proves difficult due to the processing speed of the conveyer and the shape of the article.

SUMMARY OF THE TECHNOLOGY

One aspect of the present technology is to provide a carrier link that overcomes one or more of the shortcomings of the prior art, e.g., to maintain the article within the pocket in a secure position for later processing, e.g., inspection and/or drilling.

Another aspect of the present technology relates to a carrier link to convey at least one pellet-shaped article (e.g., caplets, tablets, lentil-shaped articles, etc.) along a predetermined conveyer path in a direction of travel. The carrier link according to an aspect of the present technology includes at least one pocket adapted to receive a pellet-shaped article.

Another aspect of the present technology relates to a conveyor apparatus for processing pellet-shaped articles in a conveyor (e.g., a conveyor loop, a conveyor belt, a plurality of carrier links or bars, and/or a carrier drum). The conveyor apparatus includes a plurality of pockets provided to the conveyor, each pocket adapted to releasably retain a pellet-shaped article.

Another aspect of the present technology relates to a carrier link to convey at least one pellet-shaped article along a predetermined conveyer path in a direction of travel includes at least one pocket adapted to receive a pellet-shaped article and a lead-in surface provided to an upper exterior surface of the carrier link and extending into leading edges of the pocket. Each pocket includes a longitudinal axis that is transverse to a direction of travel of the carrier link. The lead-in surface provides a ramped or declined surface into the pocket to facilitate entry of the pellet-shaped article into the pocket. The lead-in surface is ramped or declined towards a side of the carrier link to facilitate rotating, guiding, and/or orienting of the pellet-shaped article into the pocket.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of this technology. In such drawings.

DETAILED DESCRIPTION OF ILLUSTRATED EXAMPLES

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
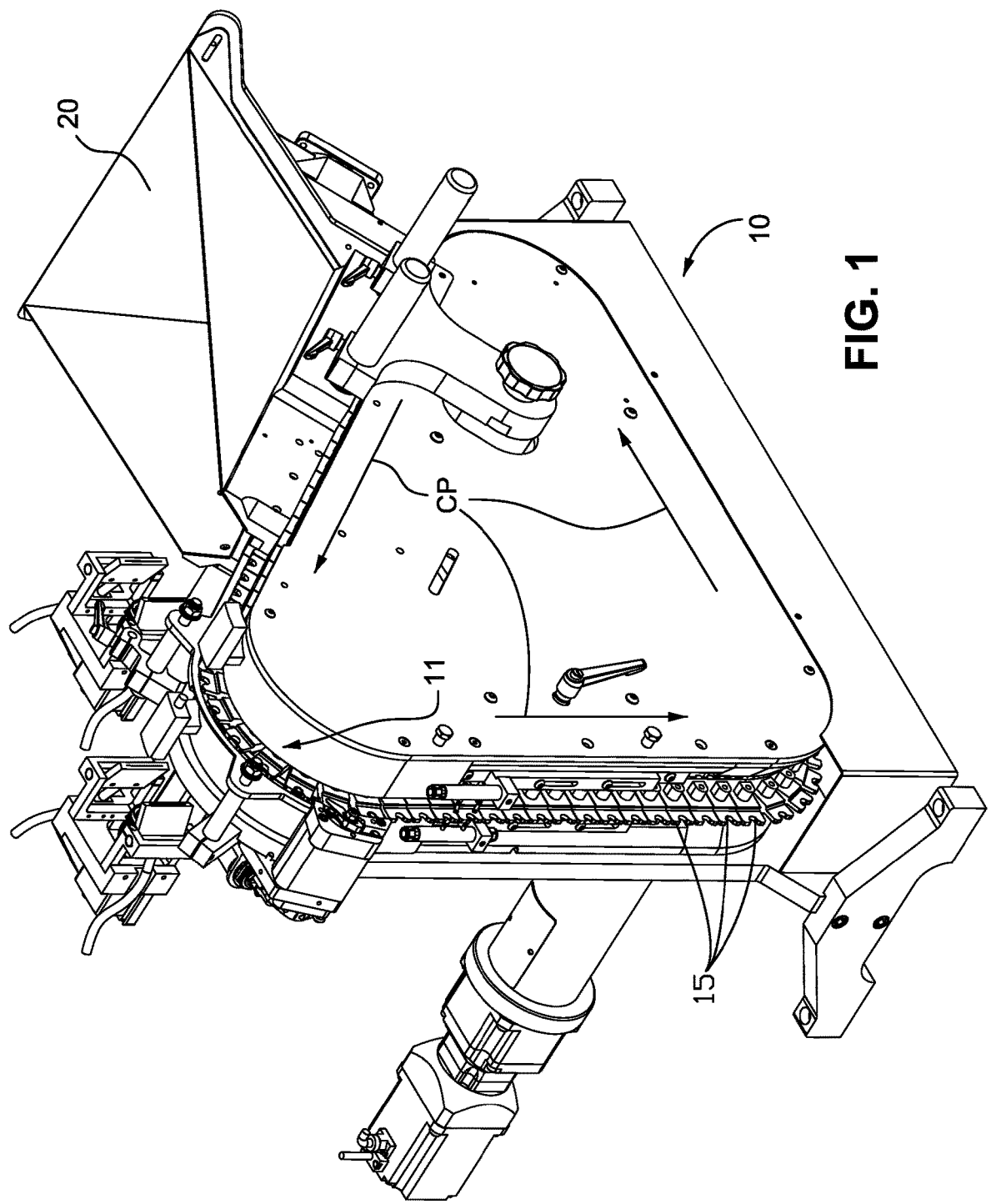
FIG. 1 is a perspective view of a conveyer apparatus for conveying a plurality of pellet-shaped articles according to an example of the present technology.

FIG. 1 illustrates an exemplary conveyer apparatus 10 for transporting, inspecting, and processing pellet-shaped articles. In the example, the conveyer apparatus 10 may include a conveyer 11 that transports the pellet-shaped articles along a conveyer path CP. The conveyer 11 may also include carrier links 15, each having a pocket to transport individual pellet-shaped articles along a predetermined conveyer path CP. It should be understood, however, that alternative examples of the technology may include carrier links 15 having multiple pockets such that each carrier link is able to transport multiple pellet-shaped articles. Alternatively or additionally, other apparatuses may also be used to convey the pellet-shaped articles, such as a conveyor belt, a conveyor loop, and/or a carrier drum. Examples of such apparatuses may be found in U.S. Pat. No. 8,072,590, which is incorporated herein by reference in its entirety.

FIGS. 9 to 20 illustrate a carrier link 115 according to an example of the present technology. As described in greater detail below, the carrier link 115 is structured to receive and positively seat a pellet-shaped article in the form of a longitudinally compressed tablet (LCT) 5. However, it should be appreciated that the carrier link may be adapted for use with other pellet-shaped articles.

As described in greater detail below, each carrier link 115 is structured to receive and positively seat the LCT within the pocket of the carrier link in a manner that ensures that both ends of the LCT are viewable or exposed and stabilized for processing operations such as inspecting, drilling and/or marking. It should also be appreciated that an entire side of the LCT is also viewable or exposed when seated within the pocket of the carrier link (e.g., when viewed from a top of the carrier link).

Figure 7:
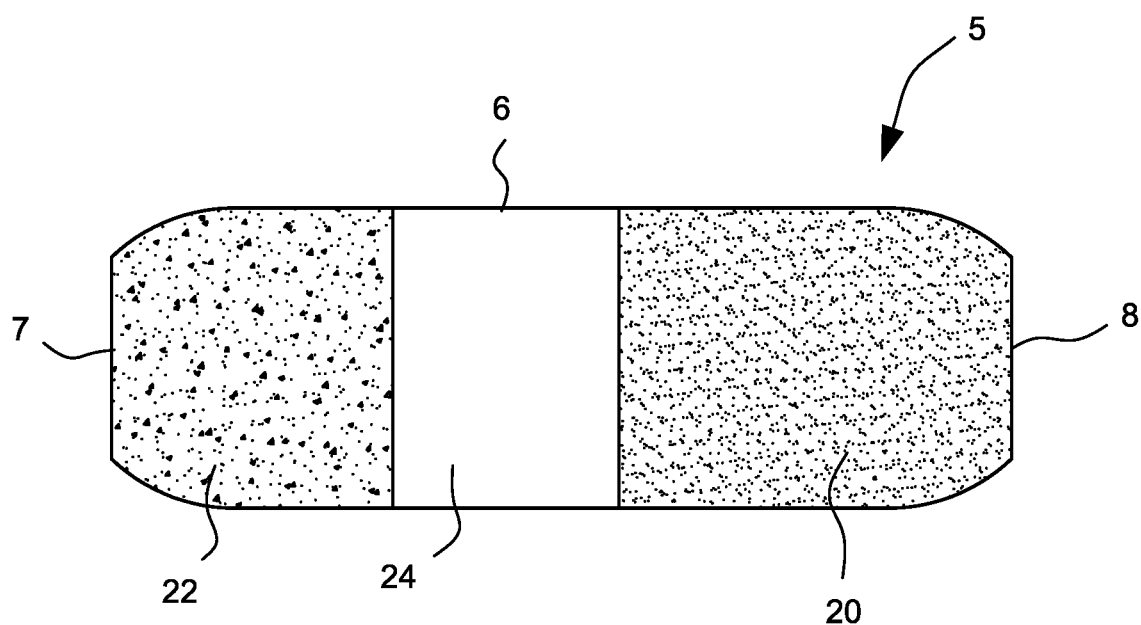
FIG. 7 is a side view of an example of a pellet-shaped article.
Figure 8:
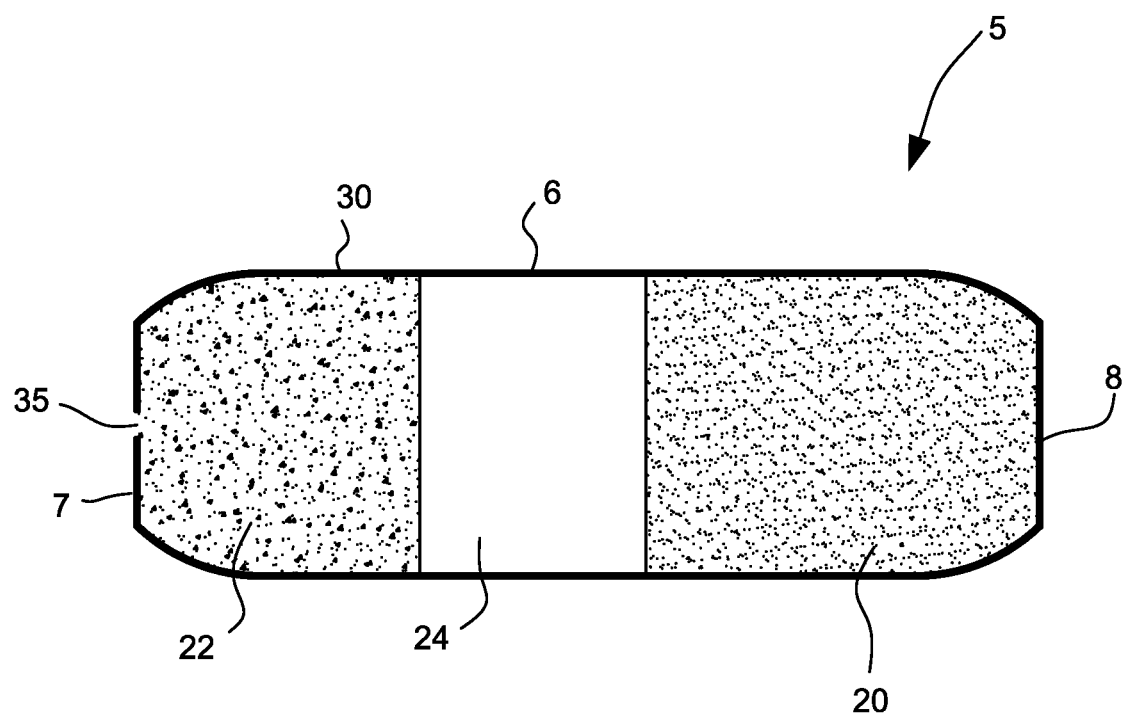
FIG. 8 is a cross-sectional view through line 7-7 of FIG. 7.

As best shown in FIGS. 7 and 8, each LCT 5 includes an elongated and cylindrical main body 6 with a first narrow, rounded end 7 and a second narrow, rounded end 8 opposite the first end 7. The LCT 5 comprises a multilayer formulation including a push layer 20 and one or more drug layers (e.g., first and second drug layers 22, 24 as illustrated) contained within a semipermeable membrane or shell 30. To enable delivery of the drugs, a delivery orifice 35 is created (e.g., laser drilled orifice) in one of the first and second ends 7, 8 of the membrane or shell 35, i.e., the first or dispensing end 7 adjacent the first drug layer 22. In use, water is absorbed through the membrane or shell 30, causing the push layer 20 to expand or swell, which pushes the drug layers 22, 24 through the delivery orifice 35 at a predetermined rate ("time release").

In the illustrated example, the first end 7 and the second end 8 may have a first characteristic and a second characteristic, respectively, that are different from one another. For example, the first and second characteristics may be colors such that the first end 7 adjacent the first drug layer 22 is colored differently from the second end 8 adjacent the push layer 20. Such different coloring distinguishes the first and second ends 7, 8 to allow the delivery orifice 35 to be provided to the correct end, i.e., the first or delivery end 7.

Figure 11:
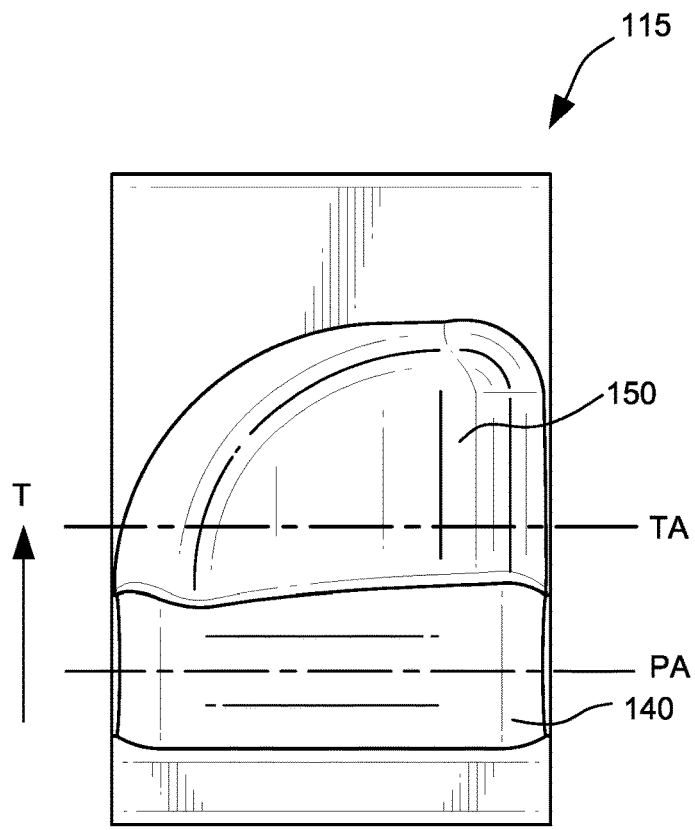
FIG. 11 is a top view of the carrier link of FIG. 9.
Figure 12:
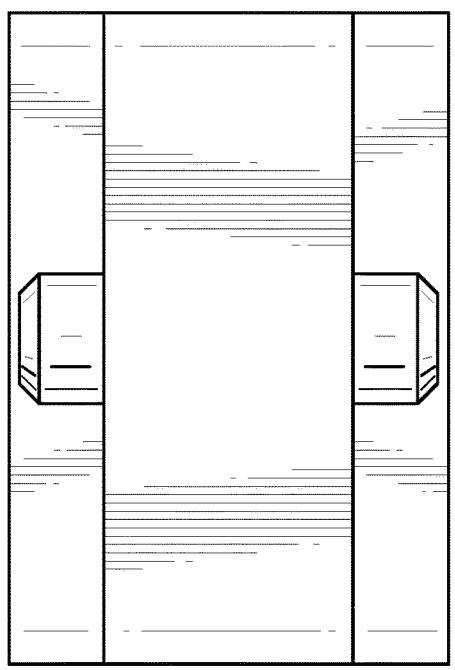
FIG. 12 is a bottom view of the carrier link of FIG. 9.
Figure 13:
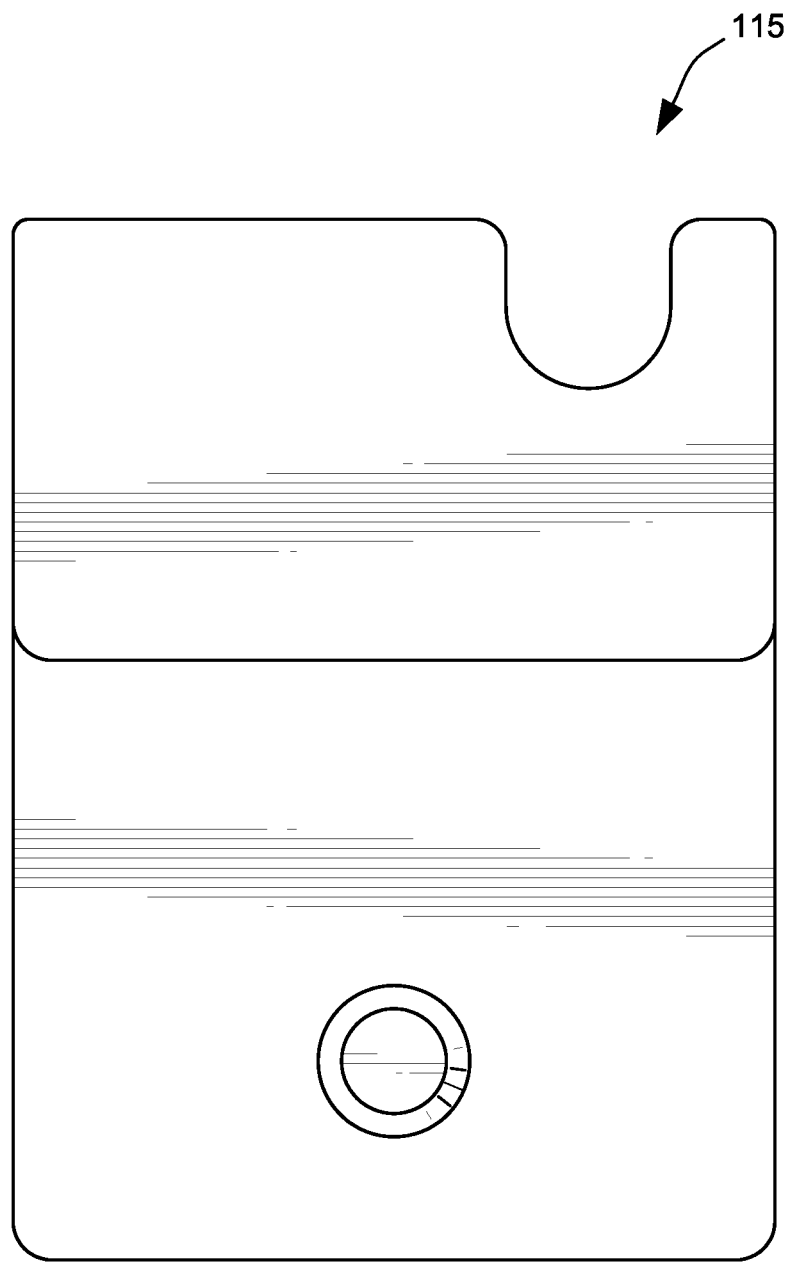
FIG. 13 is a side view of the carrier link of FIG. 9.
Figure 14:
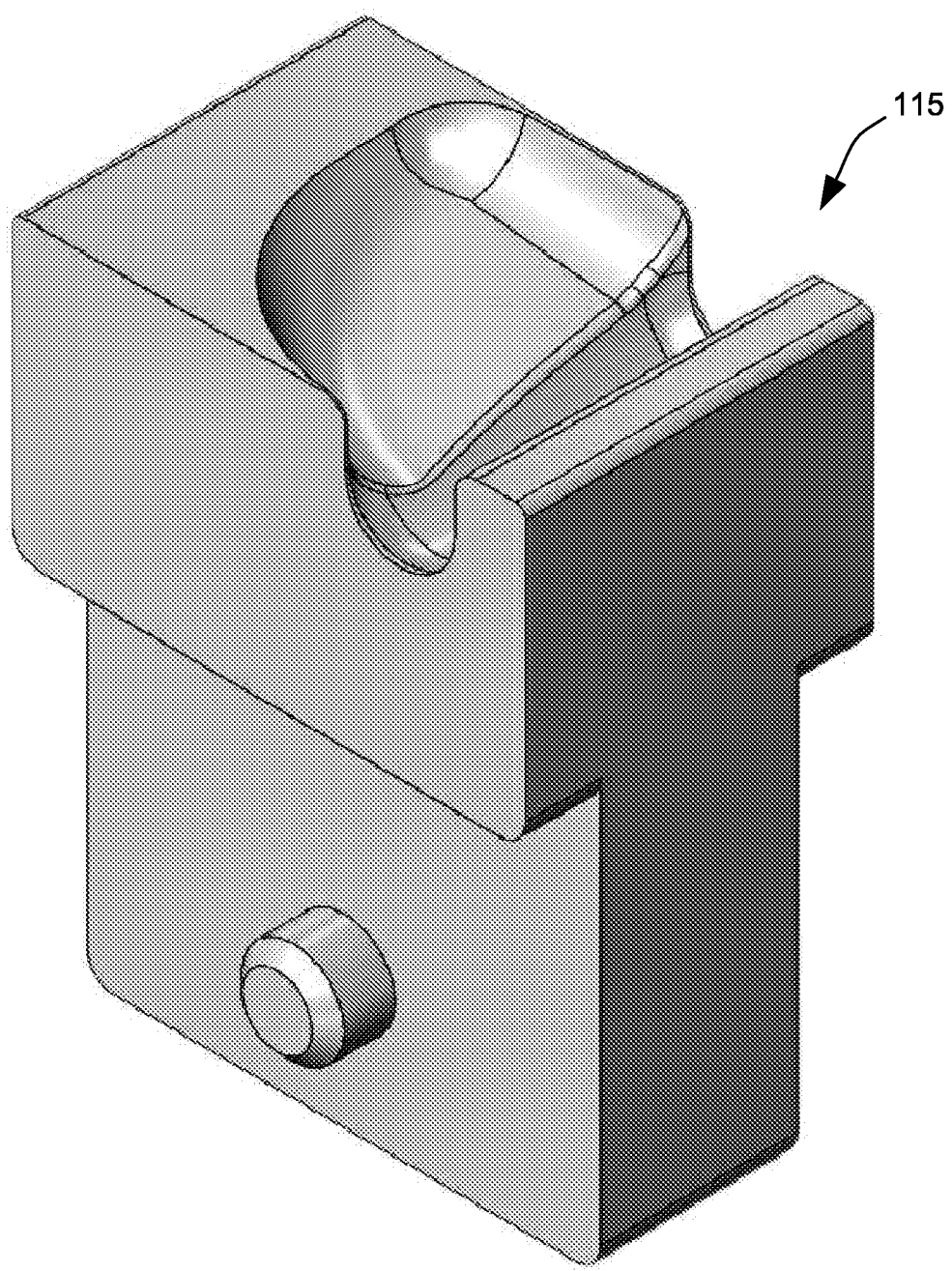
FIG. 14 is another perspective view of the carrier link of FIG. 9.
Figure 15:
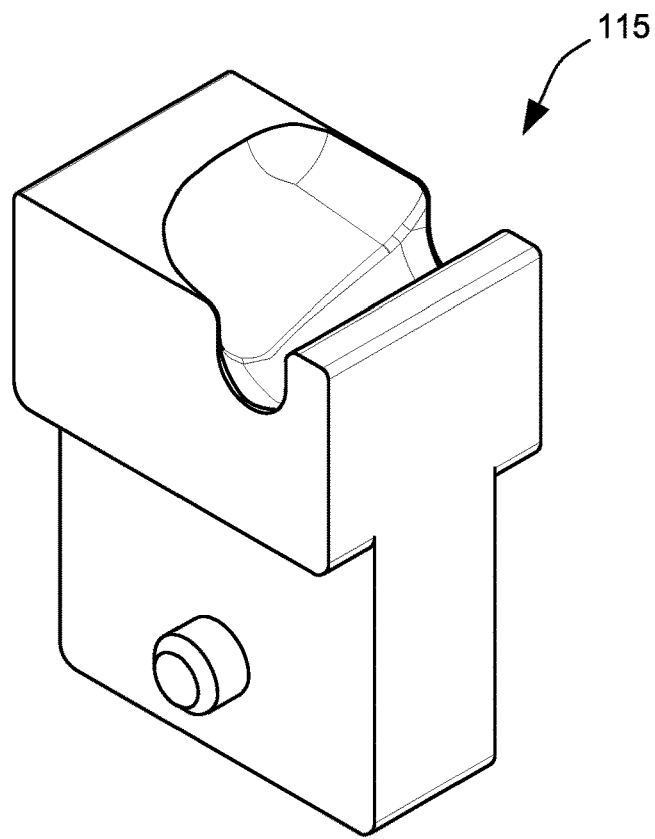
FIGS. 15 to 20 are various views of the carrier link of FIG. 9.
Figure 16:
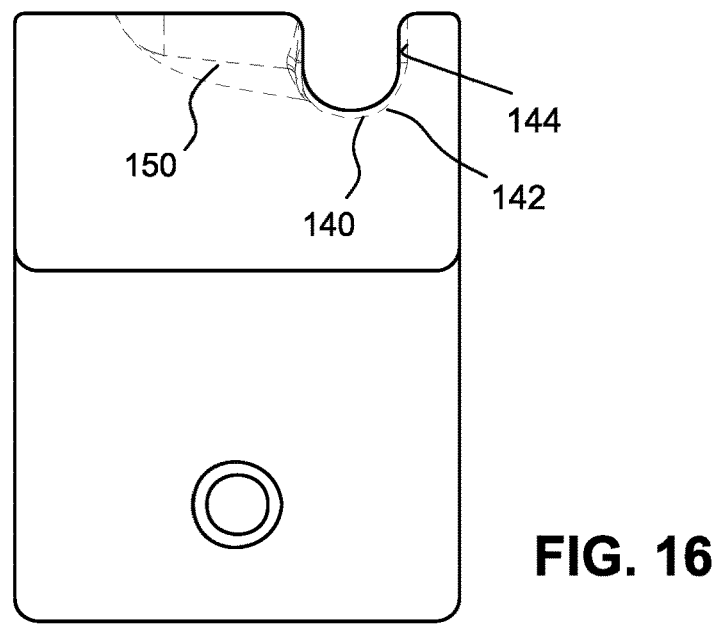
Figure 17:
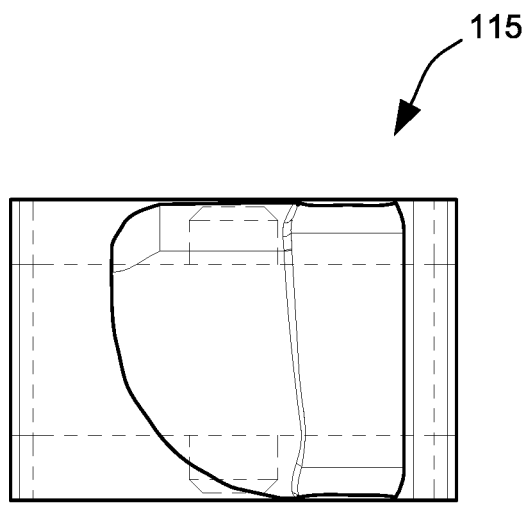
Figure 18:
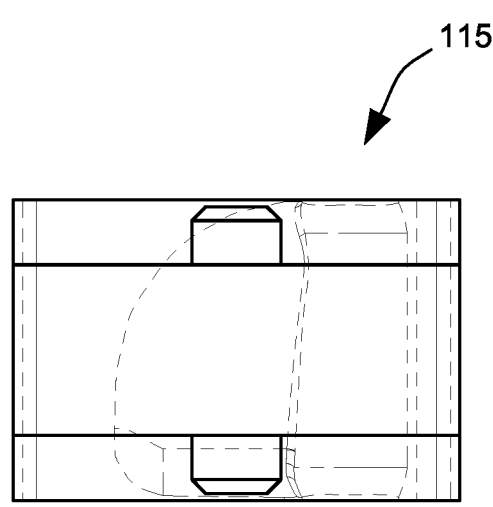

Referring to FIGS. 9 to 20, the carrier link 115 includes one tablet receiving pocket 140 that is arranged or oriented such that a longitudinal axis PA of the pocket is transverse (i.e., perpendicular) to the direction of travel (as indicated by the arrow T) of the carrier link (e.g., see FIG. 11).

Specifically, as best shown in FIG. 11, the carrier link 115 includes a transverse axis TA which extends transverse to the direction of travel T of the carrier link 115. The longitudinal axis PA of the pocket 140 is generally parallel to the transverse axis TA of the carrier link 115. Such orientation of the pocket 140 helps to properly seat and retain the LCT within the pocket 140 such that the first and second ends 7, 8 of the LCT are viewable or exposed for processing operations such as inspecting, drilling and/or marking.

Figure 9:
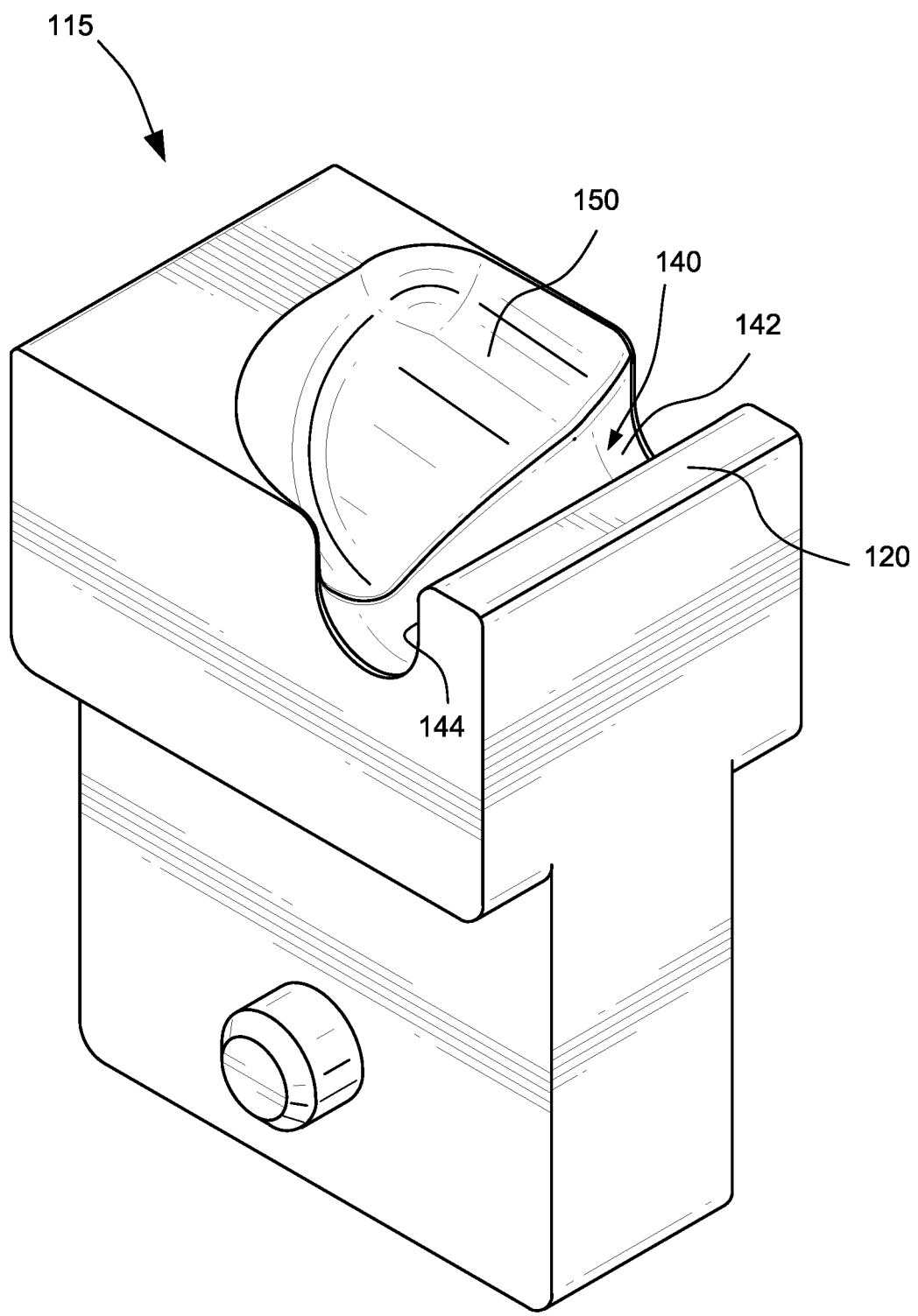
FIG. 9 is a perspective view of a carrier link according to an example of the present technology.
Figure 10:
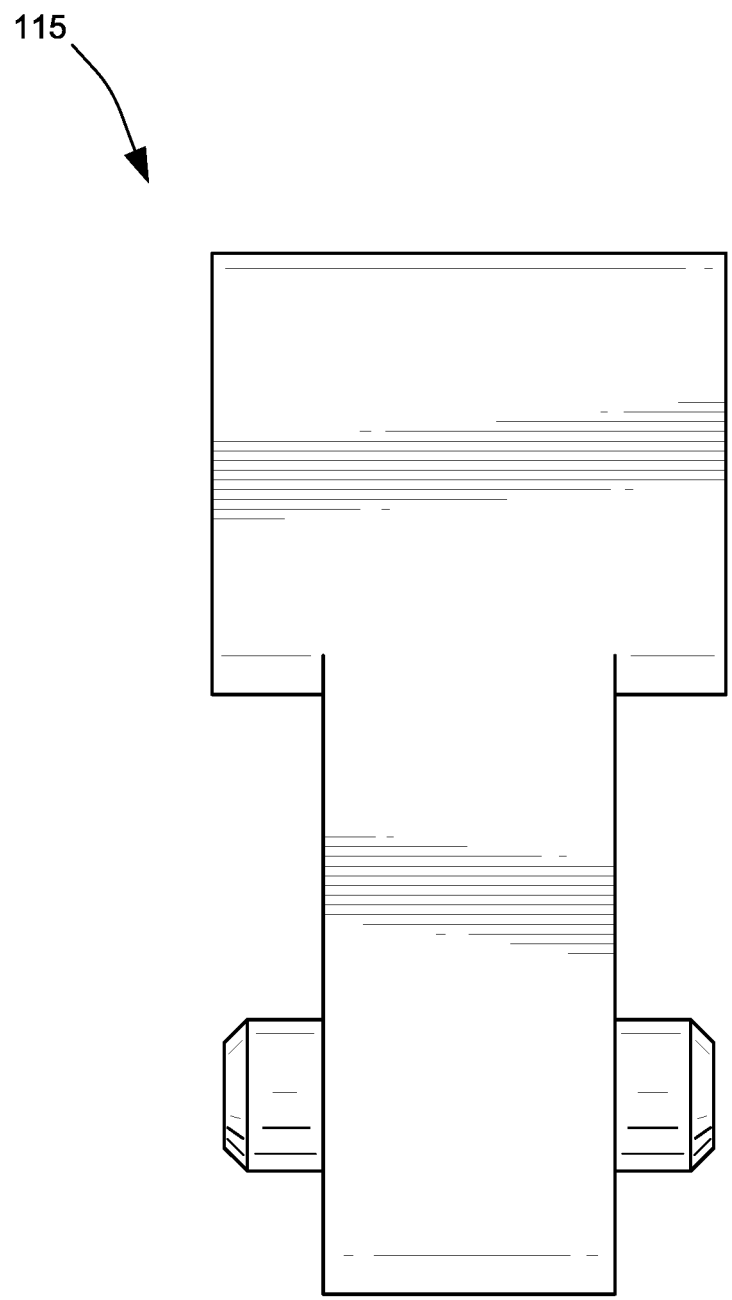
FIG. 10 is a front view of the carrier link of FIG. 9.
Figure 19:
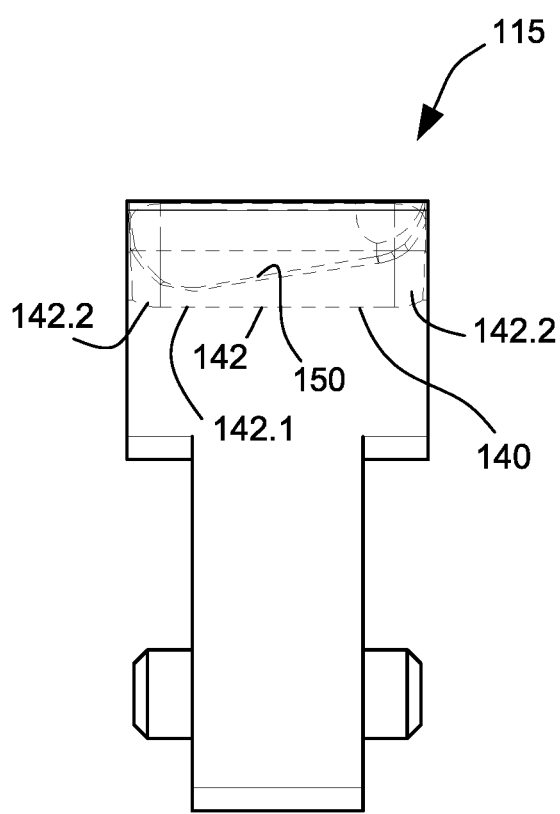
Figure 20:
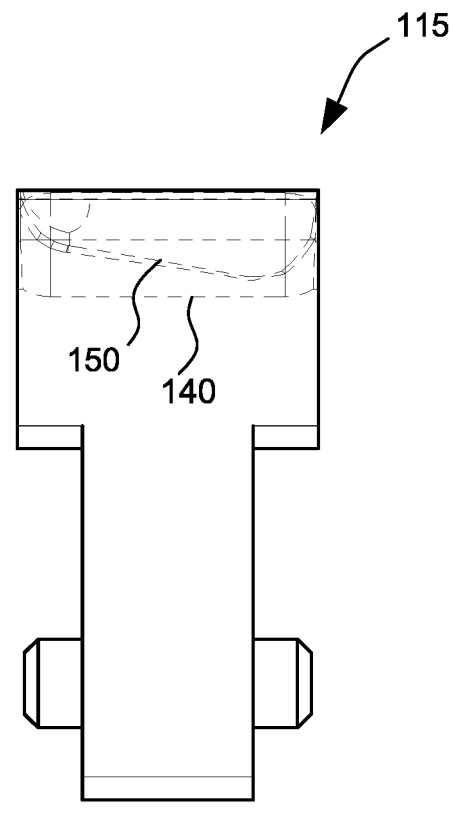

As best shown in FIGS. 9 and 11, the pocket 140 includes a bottom surface 142 that is suitably shaped or contoured to substantially conform to the exterior shape of the LCT, e.g., a generally cylindrical central portion 142.1 with radiused or tapered end portions 142.2 as shown in FIG. 19. That is, the pocket 140 is suitably contoured to cradle the LCT such that the LCT is stably supported along opposing sides within the pocket 140.

A side support surface 144 extends upwardly from a lower side of the bottom surface 142 to the top or upper surface 120 of the carrier link. The side support surface 144 is structured to support a side of the LCT along substantially its entire length.

In an example, the depth of the pocket 140, i.e. the distance from the top surface 120 of the carrier link to the bottom surface 142 may be dimensioned such that when the LCT is seated therein a portion of the LCT may extend above the top surface 120 of the carrier link. However, in alternative examples, the top portion of the LCT may be flush or below the top surface of the carrier link.

A lead-in surface 150 is provided in the upper exterior surface of the carrier link and extends into leading edges of the pocket 140. As viewed from above in FIG. 11, the lead-in surface 150 includes a general sector-shape including a generally semi-circular portion that proceeds into the leading edges of the pocket 140. The lead-in surface provides a ramped or declined surface (e.g., see FIG. 16) into the pocket 140 to facilitate entry of the LCT into the pocket 140.

Also, the lead-in surface 150 is ramped, declined, or angled towards a side of the carrier link (e.g., see FIGS. 19 and 20) to facilitate rotating, guiding, and/or orienting of the LCT into the pocket 140.

Edges of the lead-in surface 150 adjacent the pocket 140 may be rounded or tapered to facilitate entry of the LCT into the pocket 140.

The pocket 140 holds the LCT in a horizontal position, and lateral ends of the pocket are configured and arranged to only slightly overlap respective ends 7, 8 of the LCT so as to laterally retain the LCT within the pocket (e.g., help maintain the LCT in position in a stable manner to prevent movement during processing) but allow respective ends of the LCT to be sufficiently exposed for processing operations.

As noted above, the pocket 140 may be arranged so that a top portion of the LCT may extend above the top surface 120 of the carrier link. This is advantageous during the LCT loading step, e.g., where a hopper is located. The hopper can be configured to receive a number of LCTs in random order/orientation, and the hopper is structured to place a plurality of LCTs in communication with the upper surfaces of a plurality of carrier links. Once a LCT is seated within a pocket while in the hopper, the top portion of the LCT that is exposed can then contact the remaining non-seated LCTs in the hopper. The result is that the non-seated LCTs are agitated or otherwise moved, which in turn helps to rotate and properly seat the seated LCT within the respective pocket.

Moreover, the declined orientation of the lead-in surface 150 of each carrier link along with gravity helps to properly rotate, guide, orient, and seat the LCT with the pocket 140. That is, the lead-in surface 150 is configured and oriented to cause the LCT to rotate and/or slide such that the longitudinal axis of the LCT extends generally parallel to the longitudinal axis PA of the pocket 140, which facilitates alignment and entry of the LCT into the pocket 140. The pocket 140 may receive the LCT in either orientation, i.e., the drug side of the LCT may be positioned on either the right or left side of the pocket.

In addition, the bottom and side support surfaces 142, 144 of the pocket positively retains the LCT within the pocket which substantially prevents the LCT from being rotated and/or knocked out of the pocket once properly seated in production.

In the illustrated example, each carrier link 115 includes a single pocket 140. In an alternative example, the carrier link may include a plurality of pockets (e.g., 2-30 pockets or more) disposed along its length. Also, in an alternative example, the pocket and lead-in surface of the carrier link may be applied to other carrier structures, e.g., carrier drum for a drum machine.

In use, the LCTs may be fed onto the conveyer by a feed hopper 20. The feed hopper may be designed to hold a large number of LCTs supplied thereto in bulk (e.g., into the hundreds). As the carrier links 115 of the conveyer pass the feed hopper 20, LCTs may be taken into pockets of the carrier links for inspecting and processing by the conveyer apparatus. In an example, the carrier links may encounter one or more seating members or blow-back members (e.g., brushes, fingers, air nozzles) before inspecting and processing.

Figure 3:
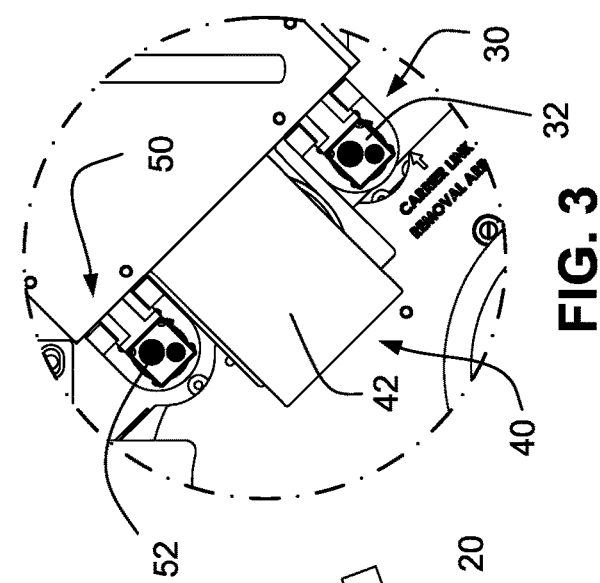
FIG. 3 is an enlarged portion of FIG. 2.
Figure 2:
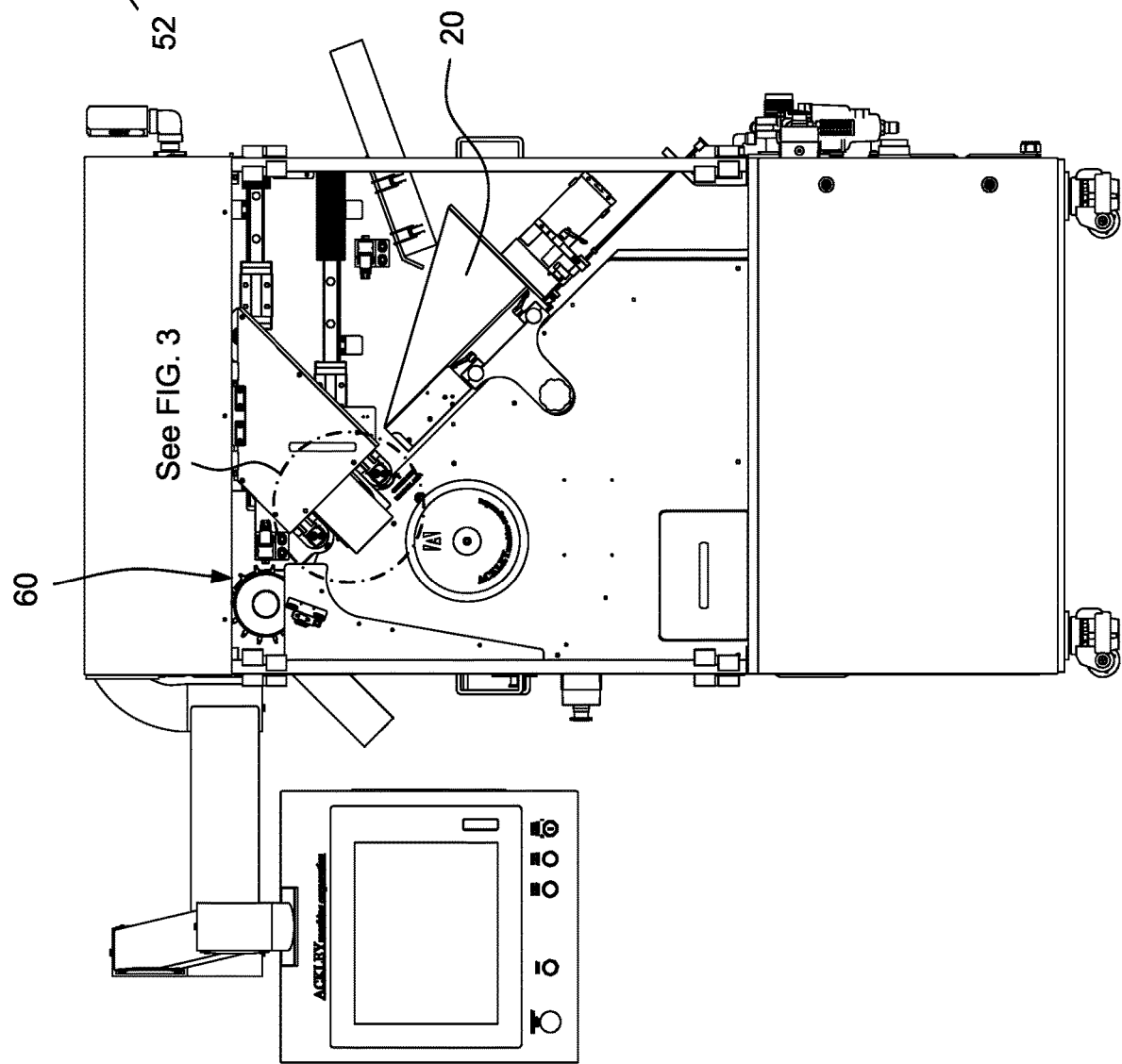
FIG. 2 is a side view of a conveyer apparatus for conveying a plurality of pellet-shaped articles according to an example of the present technology.
Figure 4:
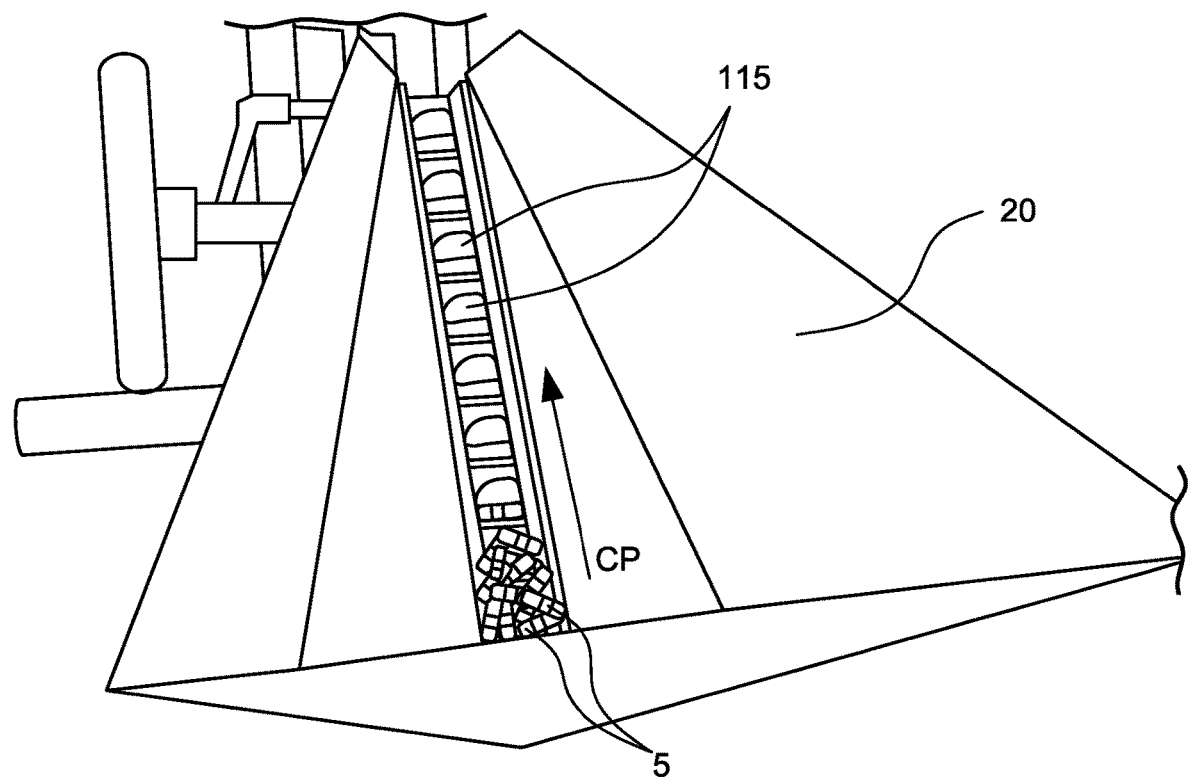
FIG. 4 is a perspective view of a conveyer apparatus including carrier links according to an example of the present technology.
Figure 5:
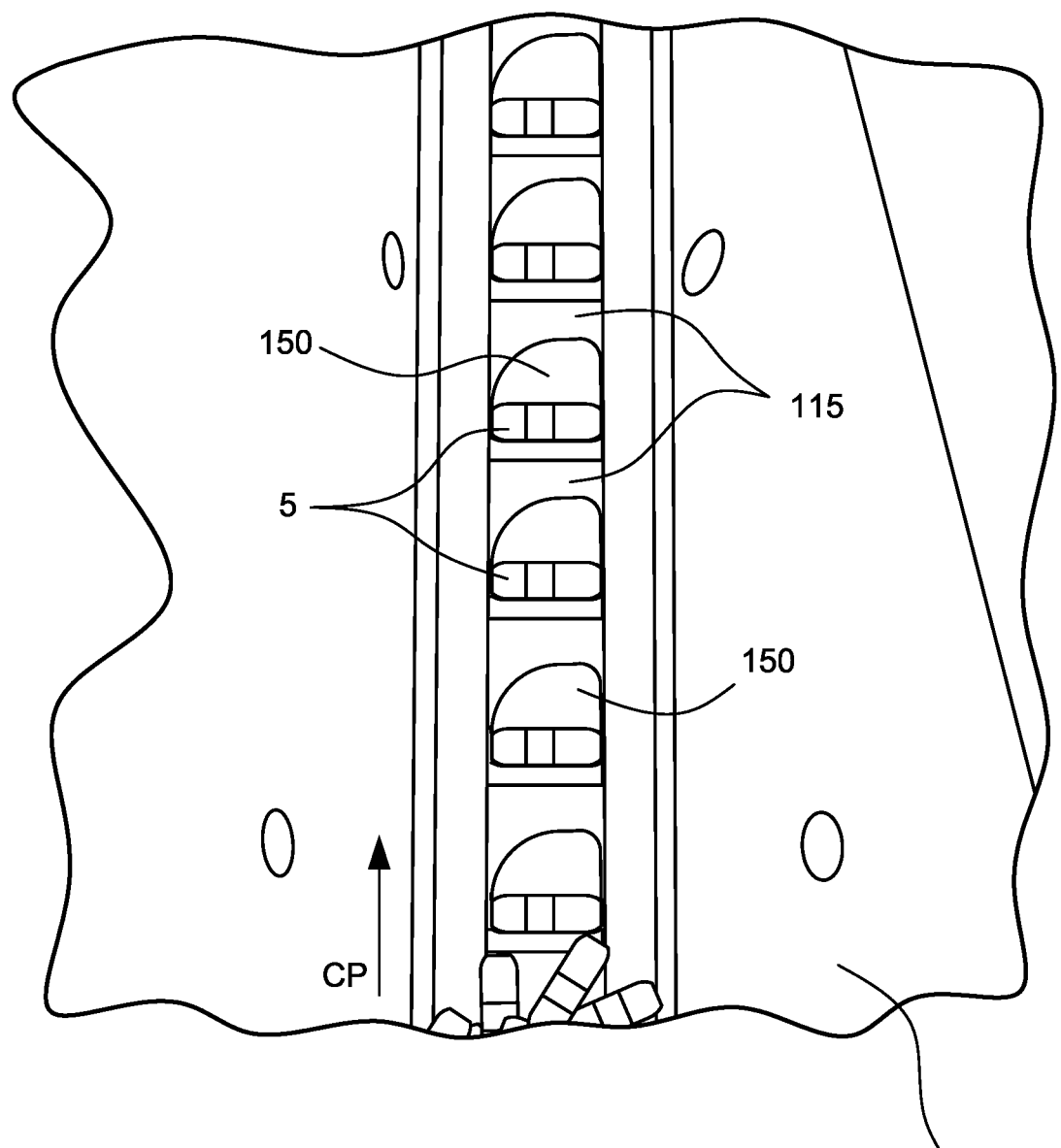
FIG. 5 is an enlarged view showing the carrier links of FIG. 4.
Figure 6:
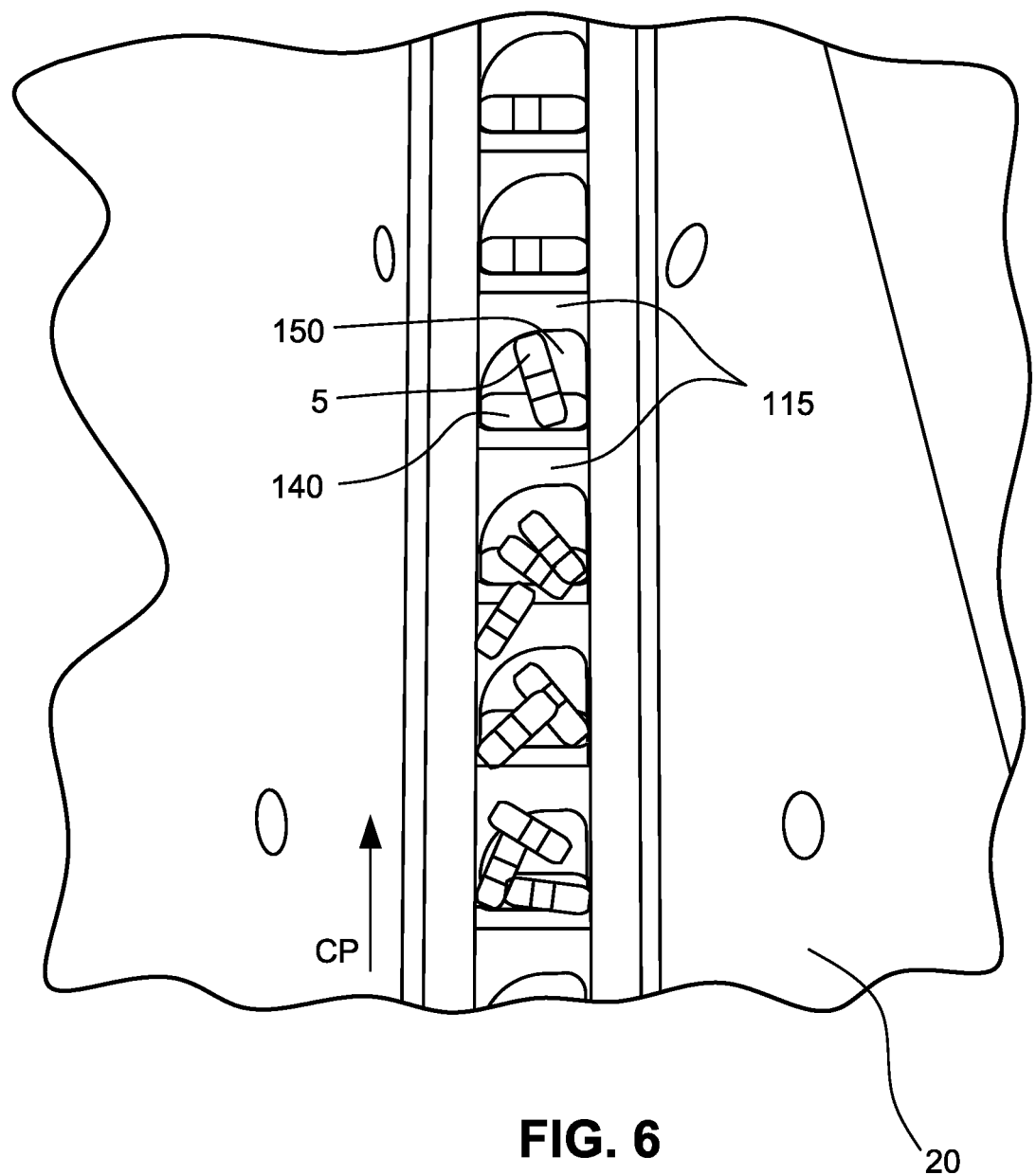
FIG. 6 is another enlarged view showing the carrier links of FIG. 4.
Figure 21:
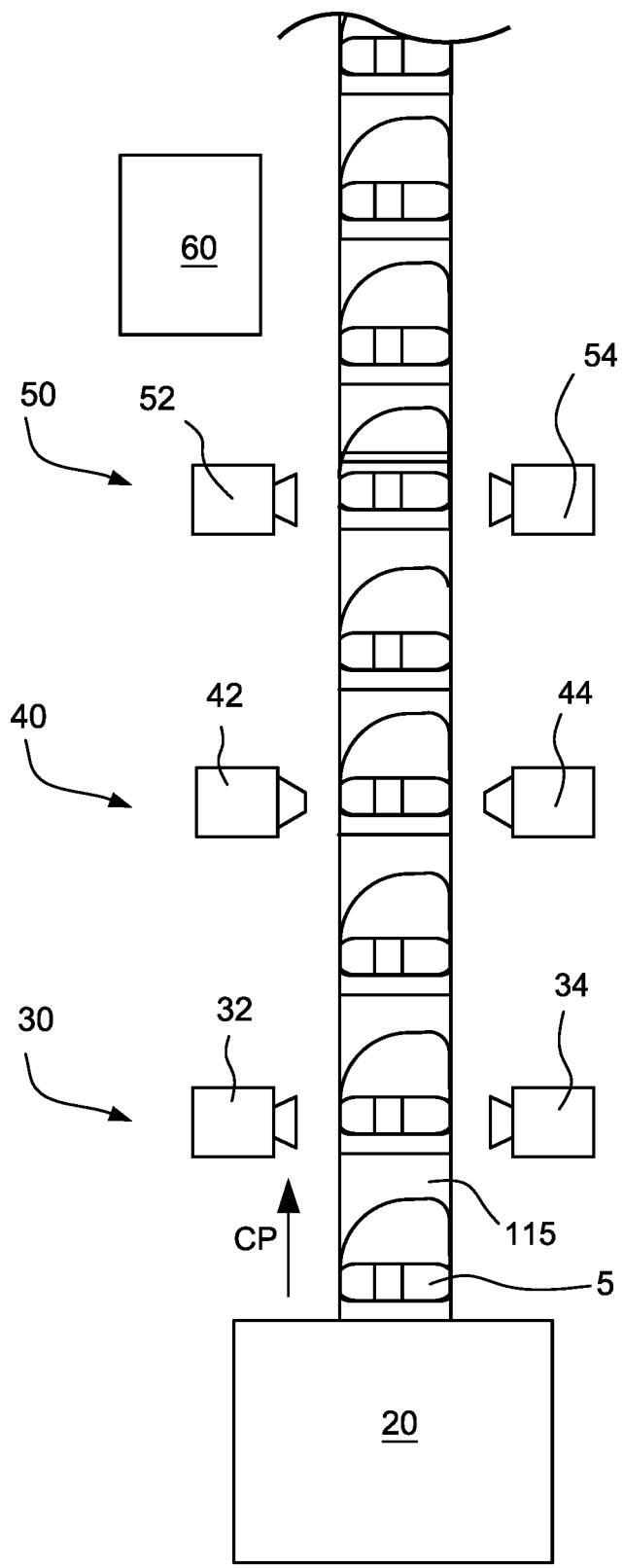
FIG. 21 is a schematic view of a conveyor apparatus including inspection, processing, and ejection units according to an example of the present technology.

As shown in FIGS. 2, 3, and 21, according to an example of the present technology, the LCTs transported by the carrier links 115 may pass a first inspection unit 30, e.g., including at least one camera for inspecting the LCTs. After passing the first inspection unit 30, the LCTs may then be processed by a processing unit 40, e.g., including a first laser and a second laser to drill the delivery orifice to the appropriate end of the LCT. Once processed, the LCTs may pass a second inspection unit 50, e.g., including at least one camera for inspecting the LCTs. Once the LCTs have passed the second inspection unit 50, they may pass an ejection unit 60 structured to eject LCTs from the conveyer e.g., eject LCTs that have been found by the inspection units to be defective and/or defectively processed. After the LCTs pass the ejection unit 60, they may continue on the conveyer for further inspection, processing, storage, packaging, etc.

As shown in FIG. 21, the first inspection unit 30 may include a first camera 32 and a second camera 34, each of which detect a characteristic of the end of LCT that is visible to that camera, e.g., detects color. Based on the characteristic detected by each of the first camera 32 and the second camera 34 (e.g., color inspection), the first inspection unit 30 determines the orientation of the LCT within the carrier link and such information is conveyed to the processing unit 40, e.g., so the processing unit 40 can process (e.g., laser drill) the correct (i.e., drug) end of the LCT. Furthermore, in the situation where a LCT was produced incorrectly such that both sides have the same color, the conveyer apparatus may determine that the LCT is defective such that it is not processed or inspected further and ejected. Alternatively, the first inspection unit 30 may include only one camera, the first camera 32 for example, to detect the end of the LCT visible to the camera and determine the orientation of the LCT.

Once the first inspection unit 30 has determined the orientation of the LCT, it will be processed accordingly by the processing unit 40. The processing unit 40 may include a first laser 42 and a second laser 44, e.g., for laser drilling a delivery orifice to the appropriate end of the LCT. However, it should be appreciated that the processing unit may include alternative processing devices, e.g., lasers for logos, printers, composition-scanning devices, etc. According to one example of the technology, the first end 7 of each LCT is to be laser-drilled with an orifice. The orifice may be laser-drilled coaxial to an axis of the LCT.

Since the LCT may be positioned within the carrier link in either orientation, the first laser 42 and the second laser 44 may each be programmed to laser-drill the orifice. Thus, depending on the orientation of the LCT within the carrier link, the first laser 42 or the second laser 44 may laser-drill the orifice on the first end of the LCT depending on whether the first end of the LCT is oriented towards the first laser or the second laser.

Once processed by the processing unit 40, the LCTs pass to the second inspection unit 50 including a third camera 52 and a fourth camera 54. The second inspection unit 50 may then inspect the drilled orifice of each LCT (e.g., monochrome inspection). The third camera 52 and the fourth camera 54 identify which end of each LCT it is facing and inspects the processing operation (e.g., drilled orifice) performed thereon. For example, the second inspection unit 50 determines whether the drilled orifice is within predetermined specifications, e.g., shape of the orifice, depth of the orifice. If the orifice is missing or not within specification, then the second inspection unit 50 may determine that that LCT is defective and instruct the ejection unit 60 to eject that LCT from the conveyer.

The ejection of defective LCTs may be performed by ejecting each defective LCT with the ejection unit 60, e.g., vacuum system to remove defective LCTs. In an alternative example, the ejection unit 60 may be configured to eject acceptable LCTs. According to another example of the technology, an additional ejection unit may be included along the conveyer path of the conveyer apparatus immediately following the first inspection unit so as to allow for the ejection of LCTs found defective by the first inspection unit.

In the illustrated example of FIGS. 2, 3, and 21, the first inspection unit 30, the processing unit 40, and the second inspection unit 50 are oriented and arranged to detect, inspect and/or process ends of the LCT, e.g., detect, inspect and/or process a spot location on an end of the LCT.

Figure 22:
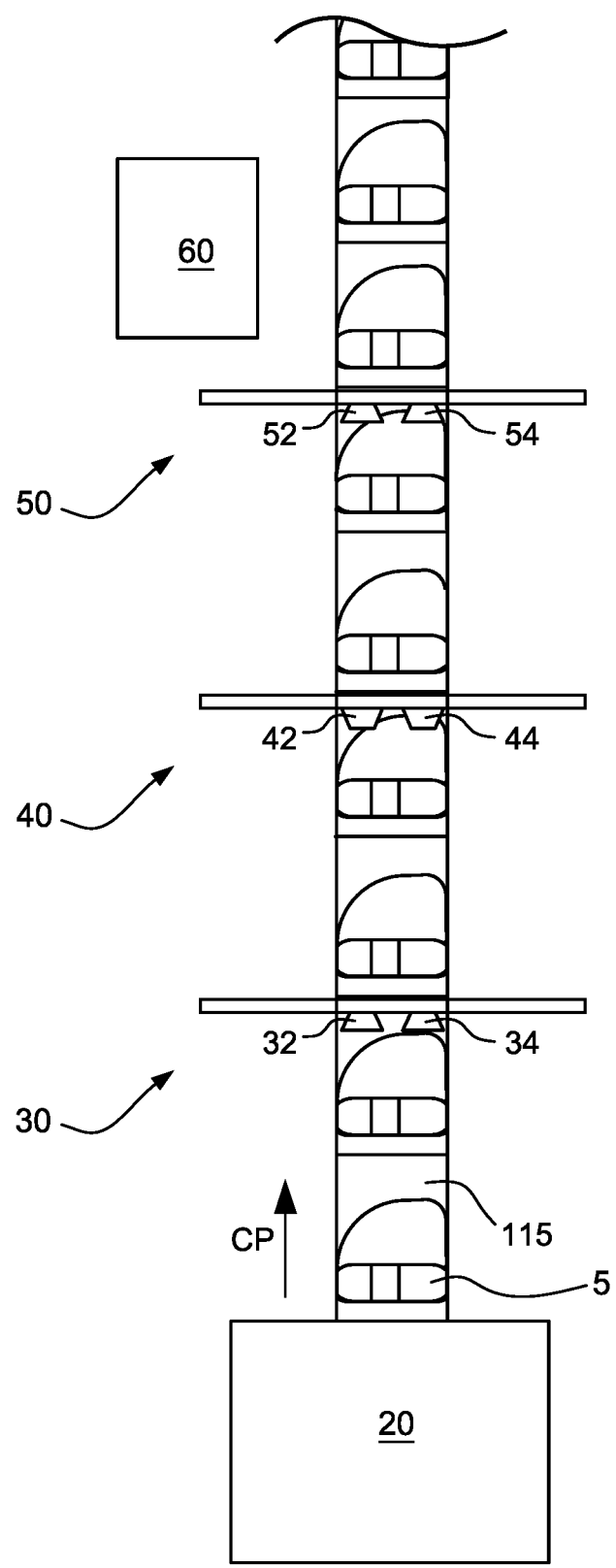
FIG. 22 is a schematic view of a conveyor apparatus including inspection, processing, and ejection units according to another example of the present technology.

In an alternative example, as shown in FIG. 22, the first inspection unit 30, the processing unit 40, and the second inspection unit 50 may be oriented and arranged to detect, inspect and/or process sides of the LCT, e.g., detect, inspect and/or process a spot location on a side of the LCT.

In yet another alternative, the first inspection unit 30, the processing unit 40, and the second inspection unit 50 include alternative arrangements relative to one another, e.g., the first inspection unit 30 may be oriented and arranged to detect or inspect sides of the LCT and the second inspection unit 50 may be oriented and arranged to detect or inspect ends of the LCT.

While the technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the technology. Also, the various examples described above may be implemented in conjunction with other examples, e.g., aspects of one example may be combined with aspects of another example to realize yet other examples. Further, each independent feature or component of any given assembly may constitute an additional example.

What is claimed is:

1. A carrier link to convey at least one pellet-shaped article along a predetermined conveyer path in a direction of travel, the pellet-shaped article including an elongated main body forming sides of the pellet-shaped article, a first end, and a second end opposite the first end, and the pellet-shaped article including a longitudinal axis that is coaxial with a center of each of the first and second ends, the carrier link comprising:
   at least one pocket adapted to receive a pellet-shaped article, each pocket including a longitudinal axis that is transverse to the direction of travel of the carrier link; and
   a lead-in surface provided to an upper exterior surface of the carrier link and extending into leading edges of the pocket,
   wherein the lead-in surface provides a ramped or declined surface into the pocket to facilitate entry of the pellet-shaped article into the pocket,
   wherein the lead-in surface is ramped or declined towards a side of the carrier link to facilitate rotating, guiding, and/or orienting of the pellet-shaped article into the pocket, and
   wherein the pocket is structured and arranged to overlap at least a portion of each of the first and second ends of the pellet-shaped article so as to laterally retain the pellet-shaped article within the pocket but allow at least a portion of each of the first and second ends of the pellet-shaped article including the center of each of the first and second ends to be viewable or exposed simultaneously for one or more processing operations.

2. The carrier link according to claim 1, wherein the lead-in surface includes a general sector shape when viewed from above.

3. The carrier link according to claim 1, wherein the pocket includes a bottom surface that is contoured to substantially conform to an exterior shape of the pellet-shaped article.

4. The carrier link according to claim 3, wherein the bottom surface includes a generally cylindrical central portion with radiused or tapered end portions.

5. The carrier link according to claim 1, wherein the pocket includes a side support surface structured to support a side of the pellet-shaped article along substantially its entire length.

6. The carrier link according to claim 1, wherein the pocket includes a depth from a top surface of the carrier link that is dimensioned to allow a top portion of the pellet-shaped article to extend above the top surface when seated therein.

7. The carrier link according to claim 1, wherein the carrier link includes a single pocket.

8. The carrier link according to claim 1, wherein the pocket is structured and arranged such that an entire side of the pellet-shaped article is viewable or exposed for one or more processing operations.

9. The carrier link according to claim 1, wherein the pellet-shaped article comprises a longitudinally compressed tablet including a multilayer formulation.

10. The carrier link according to claim 1, wherein opposing end portions of the pocket are contoured or tapered to laterally retain the pellet-shaped article within the pocket.

11. The carrier link according to claim 1, wherein the pocket includes a generally cylindrical central portion with radiused or tapered end portions to laterally retain the pellet-shaped article within the pocket.

12. A conveyer apparatus for transporting, inspecting, and processing pellet-shaped articles, the conveyer apparatus comprising:
   a conveyer including a plurality of carrier links according to claim 1;
   at least one inspection unit including at least one camera to inspect the pellet-shaped articles; and
   a processing unit including a processing device configured and arranged to perform a processing operation on the pellet-shaped articles.

13. The conveyer apparatus according to claim 12, wherein the at least one inspection unit includes a first inspection unit configured to determine an orientation of each of the pellet-shaped articles with a respective carrier link.

14. The conveyer apparatus according to claim 12, wherein the processing unit comprises a laser configured to drill an orifice to one of the first and second ends of each of the pellet-shaped articles.

15. The conveyer apparatus according to claim 14, wherein the at least one inspection unit includes a second inspection unit configured to inspect the orifice drilled to one of the first and second ends of each of the pellet-shaped articles.

16. The conveyer apparatus according to claim 12, further comprising an ejection unit including an ejector configured and arranged to eject pellet-shaped articles following inspection by the at least one inspection unit.

* * * * *